United States Patent [19]

Kagita

[11] Patent Number: 5,620,264
[45] Date of Patent: Apr. 15, 1997

[54] ERROR CONTROL SYSTEM FOR A PRINTER

[75] Inventor: Osamu Kagita, Nagano, Japan

[73] Assignee: Seiko Epson Corporation, Tokyo, Japan

[21] Appl. No.: 450,003

[22] Filed: May 25, 1995

[30] Foreign Application Priority Data

Jun. 2, 1994 [JP] Japan ................................. 6-121480

[51] Int. Cl.⁶ .................................................. B41J 29/38
[52] U.S. Cl. ............................................ 400/74; 400/703
[58] Field of Search ................................. 400/54, 74, 83, 400/703; 395/113, 114

[56] References Cited

U.S. PATENT DOCUMENTS

| | | | |
|---|---|---|---|
| 4,557,615 | 12/1985 | Ueno | 395/113 |
| 5,328,278 | 7/1994 | Kokubo | 400/74 |
| 5,502,796 | 3/1996 | Takahashi | 395/113 |

Primary Examiner—Edgar S. Burr
Assistant Examiner—Steven S. Kelley
Attorney, Agent, or Firm—Sughrue, Mion, Zinn, Macpeak & Seas

[57] ABSTRACT

An error control system that allows the user to check the content of an error after the error has occurred and prevents the user from wasting paper. The system is designed for printers that continue to print when an error not requiring a stoppage of printing has occurred. When an error not requiring the printer to stop has occurred during printing, the content of an error is written into an error log, and the operation of printing subsequent pages continues. Thereafter, when the power supply of the printer is turned off and turned on again, the system checks whether or not data is present in the error log. If the data is present, the error data in the error log is printed out along with status data for the printer on a status sheet. The error log is cleared thereafter. Preferably, even if an error that does not require printing to stop occurs, if the accumulated number of occurrences of such error has risen to a predetermined value, the printer stops the printing operation temporarily and warns the user to eliminate the cause of the error.

9 Claims, 4 Drawing Sheets

FIG. 4

STATUS SHEET

Printer Configuration

|  |  |  |  |
|---|---|---|---|
| Installed Memory | : 3.0Mbytes | Controller Version | : 28.37 |
| User Mode | : AUTOSENSE | Font Version | : 08.06 |
| CH Time Out | : 60 | Auto Continue | : OFF |
| Emulation CH P | : 3/P/Si | Standby | : DISABLE |
| Emulation CH S | : SCRPT2 | RITech | : MEDIUM |
| Emulation CH O | : SCRPT2 | Density | : L*** D |
| Toner Remaining | : E****F | Total Printed count | : 6196 |
| Language | : ENGLISH |  |  |

I/F : PARALLEL

Parallel (CH P)
  SLCT-IN   : OFF    AUTOFEED     : OFF  BUSY Delay (µs) : MIN

Serial (CH S)   RS232C
  Word Length (bit) : 8  Baudrate(bps)  : 9600  Parity    : NONE
  Stop Bit          : 2  DTR          : ON    XON/XOFF : ON
  DSR              : OFF CTS         : OFF  ENO/ACK  : OFF Receive Buffer   : 50Kbytes Mode Configuration CH  : P
  Emulation          : 3/P/Si     Version        : 22.69

Input Tray : AUTO A4  Font      : RD-0   Page Size   : A4
  Copies     : 1        Orientation : PORT Sub Configuration Form Length   : 64   Symbol Set  : Roman-8

System Configuration

Top offset  : 0           Left offset  : 0
  Full Print  : 0           Memory Left  : 2764Kbyte
  Load Macro  : 1           Power On Macro : 1

Error Log
    Paper Size Error
    Set Full Print

ERROR CONTROL SYSTEM FOR A PRINTER

BACKGROUND OF THE INVENTION

1. Field of the Invention

The invention relates to printers, and more particularly, to an improved error control system for a printer.

2. Description of Related Art

The discussion will begin with a description of an error control system for a conventional page printer. In such a conventional printer, when an error occurs during the printing of a page which does not require the printer to stop printing, the page printer continues to print the subsequent pages. An example of such an error which does not require the printer to stop printing is, e.g., an insufficient memory capacity for processing the received data or for developing an image. In the event of this type of error, the user of the printer is informed of the occurrence of such an error either through an error message displayed on a liquid crystal display or by means of an error sheet, which indicates the nature of the error and which is printed out upon occurrence of the error.

FIG. 1 is a flowchart illustrating the operation of the conventional error control system, used to inform the user that an error has occurred.

In FIG. 1, steps S2 to S11 illustrate the procedure followed by the conventional system in responding to an error that does not require the printer to cease operation, i.e., allows the printer to continue printing subsequent pages. As shown in FIG. 1, when such an error occurs (Step S8) an error message is displayed or printed out on an error sheet (Step S9). Thereafter, the printer clears the display of the error message and resumes the printing operation, to print out the subsequent pages (Step S11).

While there are many circumstances which may cause errors, some errors are simply caused through improper settings of the statuses of the printer. One example of such an error is an insufficient memory allocation for processing the received data or developing the image. To prevent such improper status-induced errors from occurring, the user must check the current statuses and change the current statuses to proper statuses, if necessary. To facilitate such a status check, the conventional printer may provide a function which prints out the current statuses on a status sheet. In FIG. 1, this function corresponds to Steps S4, S14 and S15 (see, e.g., Examined Japanese Patent Publication No. Hei. 4-22708).

It should be noted, however, that in the above-described method, if the error message is displayed on a liquid crystal display, the error is displayed only while the page concerned is being printed and is no longer displayed once the next page is being printed. This may cause the user to overlook the error message on the display. As a result, the user is likely to use the printer continuously while it is set to the same erroneous statuses, without ever eliminating the cause of the error. This, in turn, allows similar errors to recur.

On the other hand, if the error message is printed out on an error sheet, error sheets imparting the identical information are repeatedly generated, i.e., every time the same error recurs. This, in turn, leads to a needless waste of paper.

SUMMARY OF THE INVENTION

Therefore one object of the invention is to provide an error control system for a printer that is designed to continue printing when an error not requiring the printer to cease its printing operation has occurred. It is a further object of the invention to provide an error control system that is capable of checking the nature of the error after the error has occurred. It is yet another object of the invention to more reliably inform the user of printer errors, and to avoid unwarranted waste of paper.

To achieve these and other objects, a first aspect of the invention provides an error control system for controlling various parts of a printer that is designed to continue printing when an error not requiring a stoppage of printing has occurred. Such an error control system includes: a means for storing the nature, i.e., content, of an error that has occurred; a means for storing status data indicating a status currently set to the printer; and a means for printing the stored content of the error and the stored status data at a single timing.

A second aspect of the invention provides an error control system that includes a print stop control means for stopping printing whenever the accumulated number of occurrences of an error not requiring the stoppage of printing exceeds a predetermined threshold.

According to the first aspect of the invention, the content of an error (i.e., data indicative of the nature of the error) stored in the error content storage means is printed out on a status sheet together with and simultaneously with the current status data stored in the status data storage means. As a result of this operation, the user is informed of the occurrence of the error, without fail, through the information provided on the status sheet. The status sheet may be printed, e.g., when the power supply of the printer has been turned on, when a status sheet print command has been input, when the printing operation has been resumed after an error requiring a stoppage of printing has occurred, or the like. Further, once the status sheet has been printed, the error content storage means may be reset.

According to the second aspect of the invention, even if a given error does not require the printing operation to be interrupted, the printing operation is stopped if and when the number of occurrences of the error exceeds a predetermined threshold. This prevents the same error from occurring again and again. Furthermore, while the threshold may be set to a fixed value, the threshold may also be defined to have a value that is variable in accordance with the status or environment of the printer. For example, a threshold for "insufficient memory" errors may be set to a large value if the usable memory is large, or to a small value if the usable memory is small. As a result of such a configuration, print stop control which is optimal for the particular type of error encountered and for the printer environment can be implemented.

BRIEF DESCRIPTION OF THE DRAWINGS

FIG. 4 is a diagram showing an exemplary status sheet for the preferred embodiment of the invention.

DETAILED DESCRIPTION OF PREFERRED EMBODIMENTS

Preferred embodiments of the invention will now be described in detail with reference to the drawings.

Figure 1:
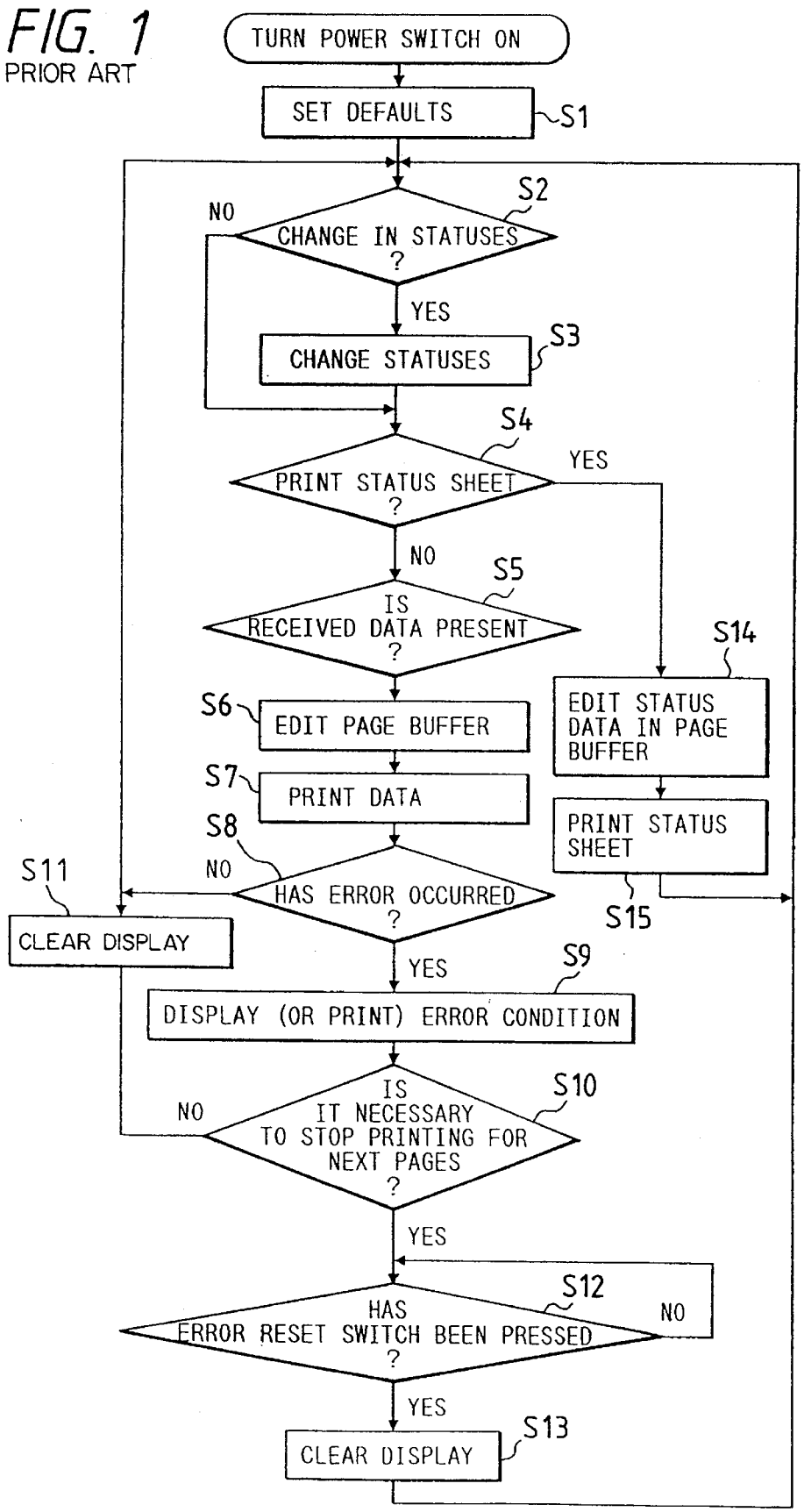
FIG. 1 is a flowchart illustrating the control operation of a conventional error control system for a printer.
Figure 2:
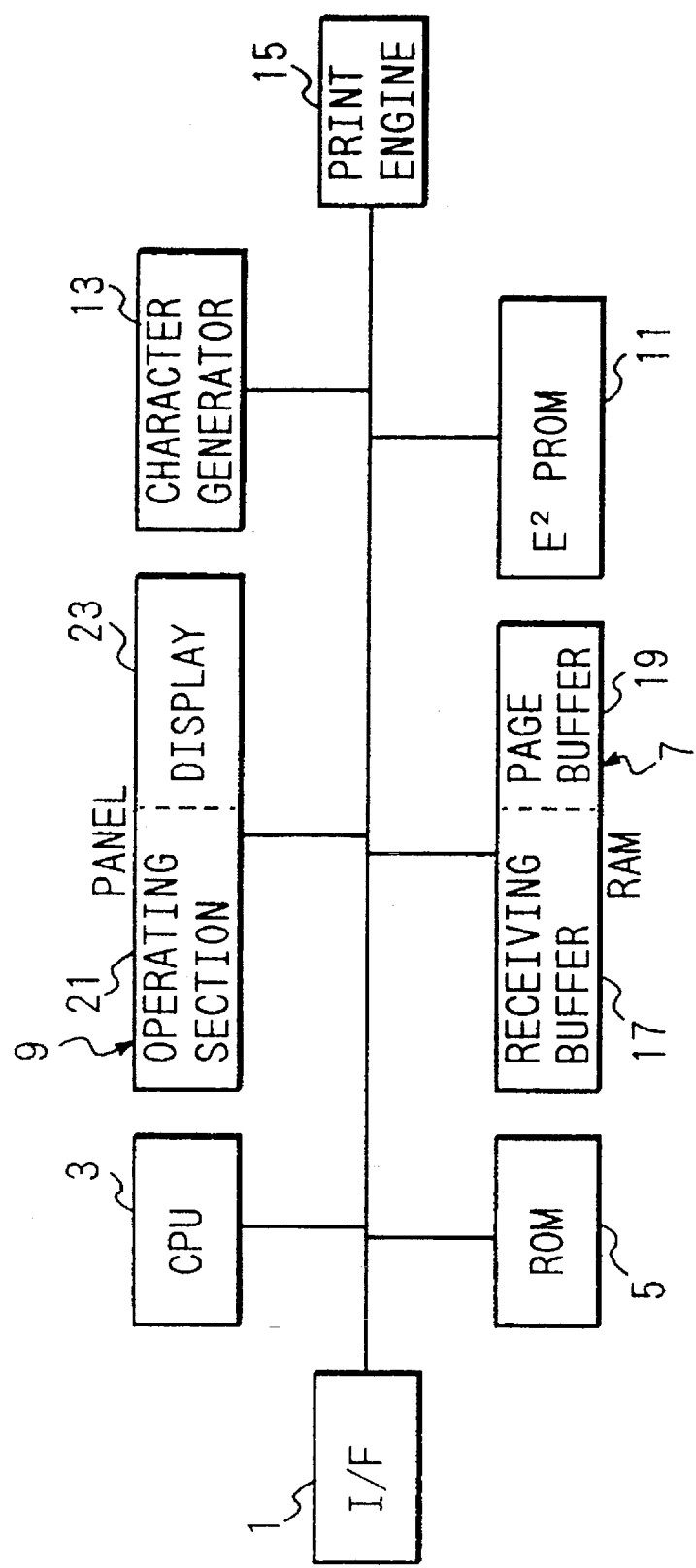
FIG. 2 is a block diagram showing a general configuration of an error control system for a printer according to one embodiment of the invention.

FIG. 2 is a block diagram showing a general configuration of a printer incorporating an embodiment of the invention. The printer includes: a communications interface 1, which interfaces with external devices, such as a host computer (not shown); a CPU 3 connected to the interface 1 through a bus line; a ROM 5; a RAM 7; a panel 9; an EEPROM (nonvolatile memory) 11; a character generator 13; and a print engine 15.

The interface 1 receives print data and control instructions used for printing from the host computer (not shown) and transfers them to the printer components.

The ROM 5 stores not only a control program for logic operations to be executed by the CPU 3, but also stores fixed data, such as items to be printed on a status sheet. The status sheet, which will be explained in greater detail below, is a printout sheet providing information on various printer conditions.

The CPU 3 processes the data received from the host computer, in order to prepare a print image in accordance with the control program stored in the ROM 5. Additionally, the CPU 3 controls the operation of various other parts of the printer needed to print out the print image.

The RAM 7 is divided into various sub-parts, which include a receiving buffer 17, a page buffer 19, a CPU work area, and the like. The receiving buffer 17 temporarily holds the data received by the CPU 3 from the host computer via the interface 1, until the processing of such data is completed by the CPU 3. The page buffer 19 holds the print image data for a plurality of pages. The buffer 19 obtains the print image data from the CPU 3 once the CPU has completed processing the received data and holds it until such image is output to the print engine 15 by the CPU 3.

The EEPROM 11 has a first area for storing status data and the like, and a second area for storing error condition data. The status data indicates print conditions and printer statuses, while the error condition data indicates the type of error, the accumulated number of occurrences of the error, the occurrence times of the error, and so forth. In the present specification, the second area is hereinafter referred to as "the error log."

In generating a status sheet, the data corresponding to the items to be printed on the status sheet (stored in the ROM 5), taken from the status data stored in the first area of the EEPROM 11, is read by the CPU 3 at the time of printing the status sheet. Such read data is developed into an image on the page buffer 19 by the CPU 3, and output to the print engine 15 for printing.

Every time an error occurs the error condition data of the error is updated in the error log of the EEPROM 11 by the CPU 3. As long as the error condition data is stored in the error log, such data will be printed on a status sheet together with the status data stored in the first area. As noted earlier, such status sheet may be generated at various times, including when the power supply for driving the printer has been turned on, when a status sheet print request has been input from the panel 9, etc. Such data is thereafter cleared by the CPU 3.

The panel 9 has an operating section 21 and a display 23 (liquid crystal panel). The operating section 21 includes a plurality of switches. Appropriate actuation of these switches causes the printer to perform various functions, such as setting or changing various statuses, printing out a status sheet, informing the user of the elimination of an error after the recovery from such error, etc. The display 23 displays set statuses, errors that have occurred, and the like based on instructions from the CPU 3.

The character generator 13 stores fonts, such as characters and symbols. Such fonts are read by the CPU 3 when a print image is to be prepared.

The print engine 15 receives image data developed in the page buffer 19 and performs the operation of printing such image data under the control of the CPU 3. As a result of this operation, regular printing operations and the aforementioned status sheet printing operations can be performed.

Figure 3:
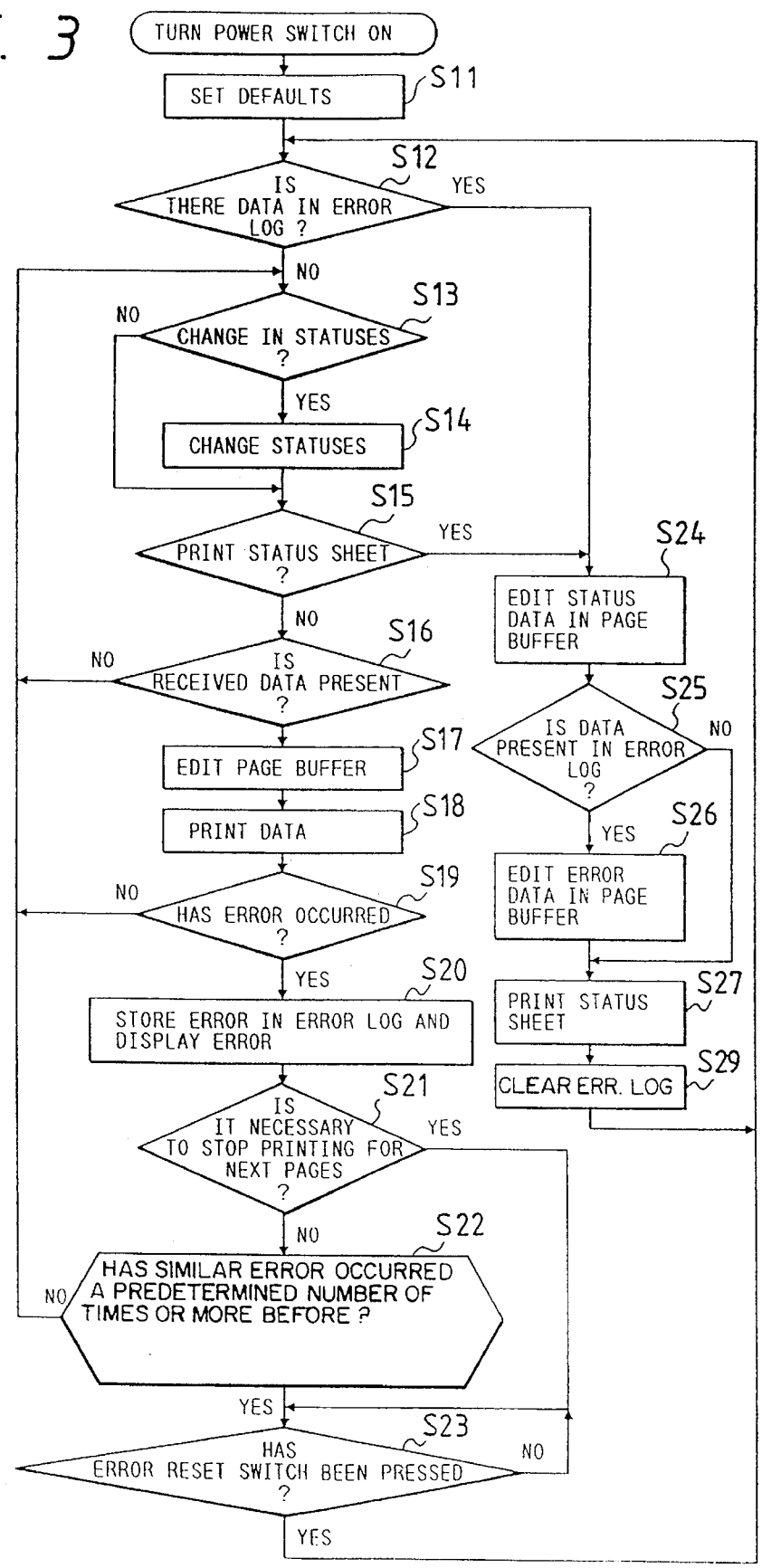
FIG. 3 is a flowchart illustrating a preferred control operation process for the system shown in FIG. 2.

FIG. 3 is a flowchart illustrating a preferred manner of operation of a control system configured as described above.

As evident from FIG. 3, upon turning on the power supply, for the purpose of driving the printer, default status settings are set (Step S11). Included in the default settings is an operational directive to check whether or not data is present in the error log in the EEPROM 11 (Step S12). Then, the system checks whether or not any status change command has been input (Step S13). If a status change command has been input, the status is changed based on this command (Step S14). After the status has been changed, the system checks whether or not a print command to print a status sheet has been input (Step S15). If the status sheet print command has not been input, the system determines whether or not data received from the host computer is present (Step S16). If this determination verifies that such received data is present, predetermined data processing is executed in order to develop a print image in the page buffer 19 (Step S17), and thereafter to print the developed print image (Step S18). During the printing process, the system checks whether or not an error has occurred (Step S19).

If, as a result of this check, it is determined that an error has occurred, the statuses of such error (error type, accumulated number of occurrences, occurrence time, and the like) are stored in the error log, and displayed on the liquid crystal panel 23 (Step S20). In addition, the system checks whether or not the error that has occurred is of such type that requires a stoppage of printing (Step S21). If it is determined that the error does not require the printer to stop printing, then the system checks whether or not the accumulated number of occurrences of such error has exceeded a predetermined value (Step S22). If this determination reveals that the accumulated number of occurrences does not exceed the predetermined value, the system returns to Step S13 to print the next page.

On the other hand, if the accumulated number of occurrences does exceed the predetermined value, or if the error that occurred requires the printer to cease printing (a paper jam, for instance), then the printing operation is brought to a halt. The printer then stands by while the user performs the appropriate recovering operation and eliminates the cause of the error. Then, when an error reset switch on the panel 9 has been pressed, (Step S23), the system returns to step S12 to resume the printing operation for the remaining pages.

Error condition data stored in the error log in the EEPROM 11 is not deleted, but rather is retained even if the power supply of the printer is turned off. When the power supply of the printer is turned on again thereafter and Step S12 reveals that data is present in the error log, the status data in the EEPROM and the error data in the error log are edited into a print image and developed into the page buffer 19 (Steps S24 to S26). The developed print image is then printed out on a status sheet (Step S27). The error log is thereafter cleared (Step S29). As a result of these operations, the user is, without fail, informed of the error history for the printer. Also, the content of the error log can be printed out on a status sheet if the status sheet print command is input (Step S15).

As a result of the aforementioned operations, the content of an error, explaining the nature of the error, is printed out together with the status data whenever the power supply is next turned on or at any time when the status sheet print request is input. This is the case even when an error not requiring a stoppage of printing occurs. Therefore, the user can be notified reliably not only of the fact that an error has occurred but also of the content of the error. In addition, since the error data is printed out together with the status data, the user is allowed to cross-reference the cause of the error to the current printer statuses. This, clearly, assists the user in deciding how best to change the statuses, to eliminate the underlying cause of the error.

Further, when the error recurs a given number of times, the printing operation is stopped, to thereby allow the user to eliminate the error. This therefore contributes to eliminating the problem of producing many incomplete printouts and eliminating the resultant waste of paper caused by recurrence of the error. It also helps direct the user's attention at an early stage to the fact that the statuses set for the printer are not proper for the user's purposes. Moreover, the status sheet is printed without fail upon resumption of the printing operation following error recovery, which, in turn, serves the double purpose of printing the status sheet and cleaning the drum.

Still further, "the predetermined value" in Step S22 may take on different values, in accordance with the type of error, with the particular statuses set for the printer, and with the printer environment. This produces the benefit of a more flexible printer control.

FIG. 4 shows an example of the status sheet. The status sheet shown in FIG. 4 is arranged to indicate the error type and the number of errors that have occurred under the title "Error Log", after the indication of various printer statuses. For example, "Paper Size Error" indicates that the size of paper is not appropriate. In this case, since the item, "Paper size," in the status data indicates "A4," it is understood that A4 paper must be provided to the sheet feeder of the printer. In addition, the error message "Set Full Print" advises the user that the "Full Print" option under the heading "System Configuration" be set to a value appropriate for the paper size. Since the current paper size is A4, the user can easily see that the value appropriate for A4 must be set to "Full Print."

It should be noted that the foregoing pertains only to preferred embodiments of the invention, and it should therefore be understood that the invention is not limited thereto.

As described above, the invention provides an error control system that allows the user to check the content of an error after the error has occurred and prevents the user from wasting paper. According to the invention, the error control system is able to reliably inform the user of the error even when used with printers that are designed to continue printing when an error not requiring a stoppage of printing has occurred.

What is claimed is:

1. An error control system for a printer designed to continue printing when an error not requiring a stoppage of printing has occurred during a print operation, comprising:

a means for responding to the occurrence of a given error by storing error content data indicating a type of error that has occurred during the print operation;

printing means for completing the print operation whenever the given error is an error not requiring the printer to stop printing;

a means for storing status data indicating operational statuses currently set for the printer;

means for checking for the error content data in said means for storing error content data in response to a power-up command following a power-down condition; and a means, responsive to said means for checking, for retrieving the stored error content data from said means for storing error content data and for printing out the stored error content data and the stored status data together on one sheet in a status print operation.

2. An error control system for a printer according to claim 1, wherein said means for retrieving and printing prints the error content data and the status data whenever a power supply for driving the printer has been turned on.

3. An error control system for a printer according to claim 1, wherein said means for retrieving and printing prints the error content data and the status data whenever an error requiring a stoppage of printing has been corrected.

4. An error control system for a printer designed to continue printing when an error not requiring a stoppage of printing has occurred during a print operation, comprising:

a means for storing number data indicating an accumulated number of occurrences of an error not requiring the stoppage of printing;

a means for updating the stored number data whenever an error not requiring the stoppage of printing occurs;

a means for storing a predetermined threshold number;

a means for determining whether the stored number data exceeds the predetermined threshold number; and a print stop control means for stopping printing during the print operation whenever said means for determining determines that the stored number data exceeds the predetermined threshold number.

5. An error control system for a printer according to claim 4, wherein said means for storing the predetermined threshold number stores a plurality of threshold values, each of the threshold values being suited to a particular status configuration of the printer;

said means for storing number data is configured to store plural categories of number data corresponding to the plurality of threshold values; and upon occurrence of an error not requiring the stoppage of printing, said means for updating determines an appropriate category from among the plural categories of number data and updates the determined category.

6. An error control method for a printer designed to continue printing when, during a print operation, an error not requiring the printer to cease printing has occurred, comprising the steps of:

in response to the occurrence of a given error, writing error description data describing the nature of the given error to an error log;

completing the print operation by printing out any remaining pages to be printed whenever the given error was an error not requiring the printer to cease printing;

following a subsequent power-off condition and in response to an externally input power-up command, checking for error description data in the error log;

printing out a status sheet that includes status data indicating operational statuses currently set for the printer together with the error description data from the error log and thereafter clearing the error log whenever, in said checking step, the error description data is found in the error log.

7. An error control method according to claim 6, further comprising the steps of:

awaiting correction of the given error and receipt of an externally input reset command whenever the given error was an error requiring the printer to cease printing;

in response to receipt of the externally input reset command, checking for error description data in the error log;

printing out a status sheet that includes status data indicating operational statuses currently set for the printer together with the error description data from the error log and thereafter clearing the error log whenever, in said checking step, error description data is found in the error log.

8. An error control method for a printer designed to continue printing when, during a print operation, an error not requiring the printer to cease printing has occurred, comprising the steps of:

in response to the occurrence of a given error, writing error description data describing the nature of the given error to an error log;

determining whether the error has occurred more than a given number of times during operation of the printer whenever the given error was an error not requiring the printer to cease printing;

completing the print operation by printing out any remaining pages to be printed whenever the given error has not occurred more than the given number of times;

awaiting correction of the error and receipt of an externally input reset command whenever the given error has occurred more than the given number of times;

in response to receipt of the externally input reset command, checking for error description data in the error log;

printing out a status sheet that includes the error description data from the error log and thereafter clearing the error log whenever in said checking step, error description data is found in the error log.

9. An error control method according to claim 8, further comprising the steps of:

awaiting correction of the error and receipt of an externally input reset command whenever the given error was an error requiring the printer to cease printing;

in response to receipt of the externally input reset command, checking for error description data in the error log;

printing out a status sheet that includes the error description data from the error log and thereafter clearing the error log whenever, in said checking step, error description data is found in the error log.

* * * * *